May 26, 1970   R. P. YEATES ETAL   3,513,804
KINGPIN LOCATION INDICATOR FOR A COLLAPSIBLE TRAILER HITCH
Filed Oct. 8, 1968   5 Sheets-Sheet 1

INVENTORS.
RICHARD P. YEATES
BORIS S. TERLECKY
BY *Samuel J. Snyder*
ATTORNEY

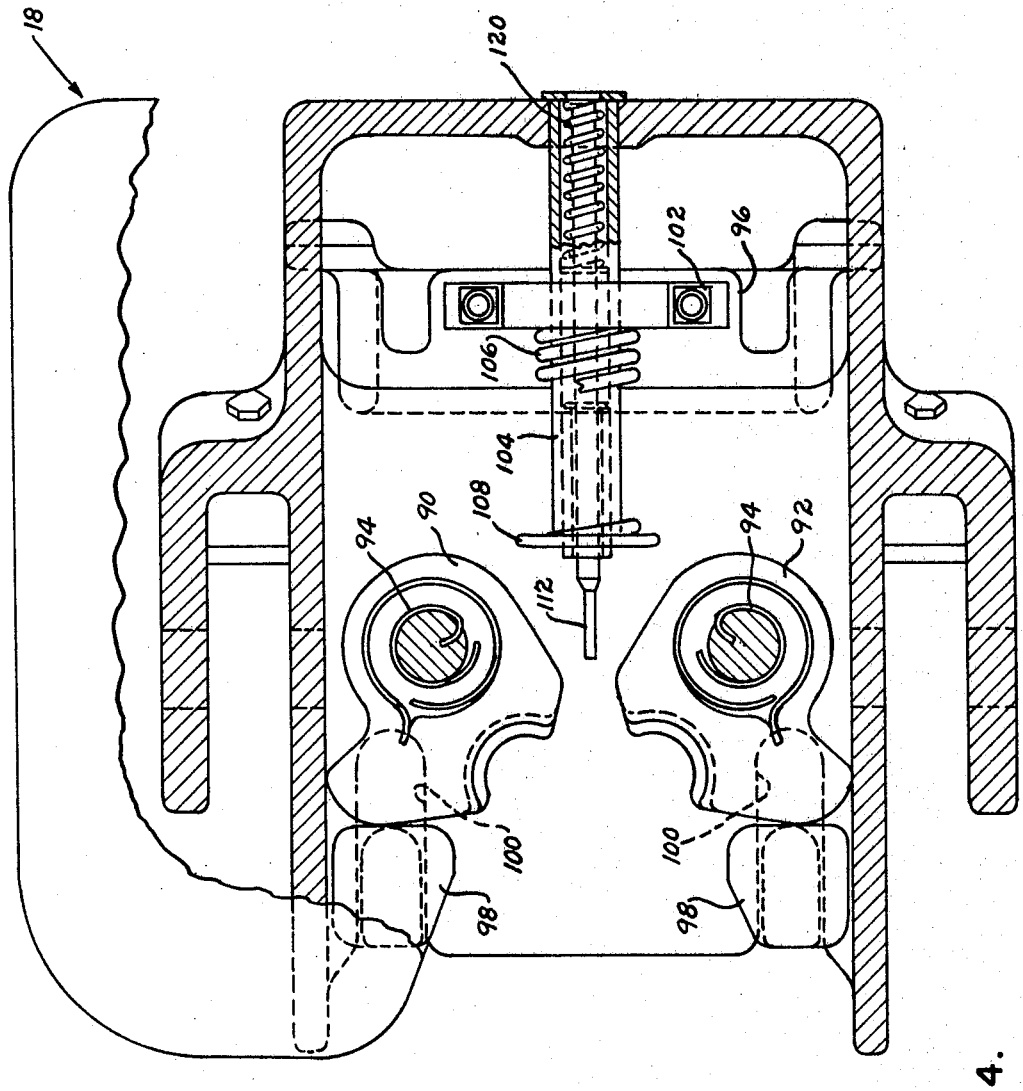
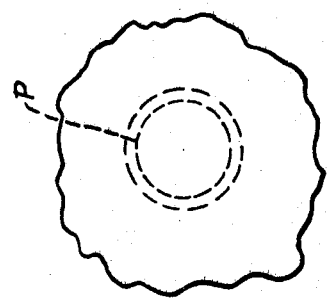
FIG. 4.

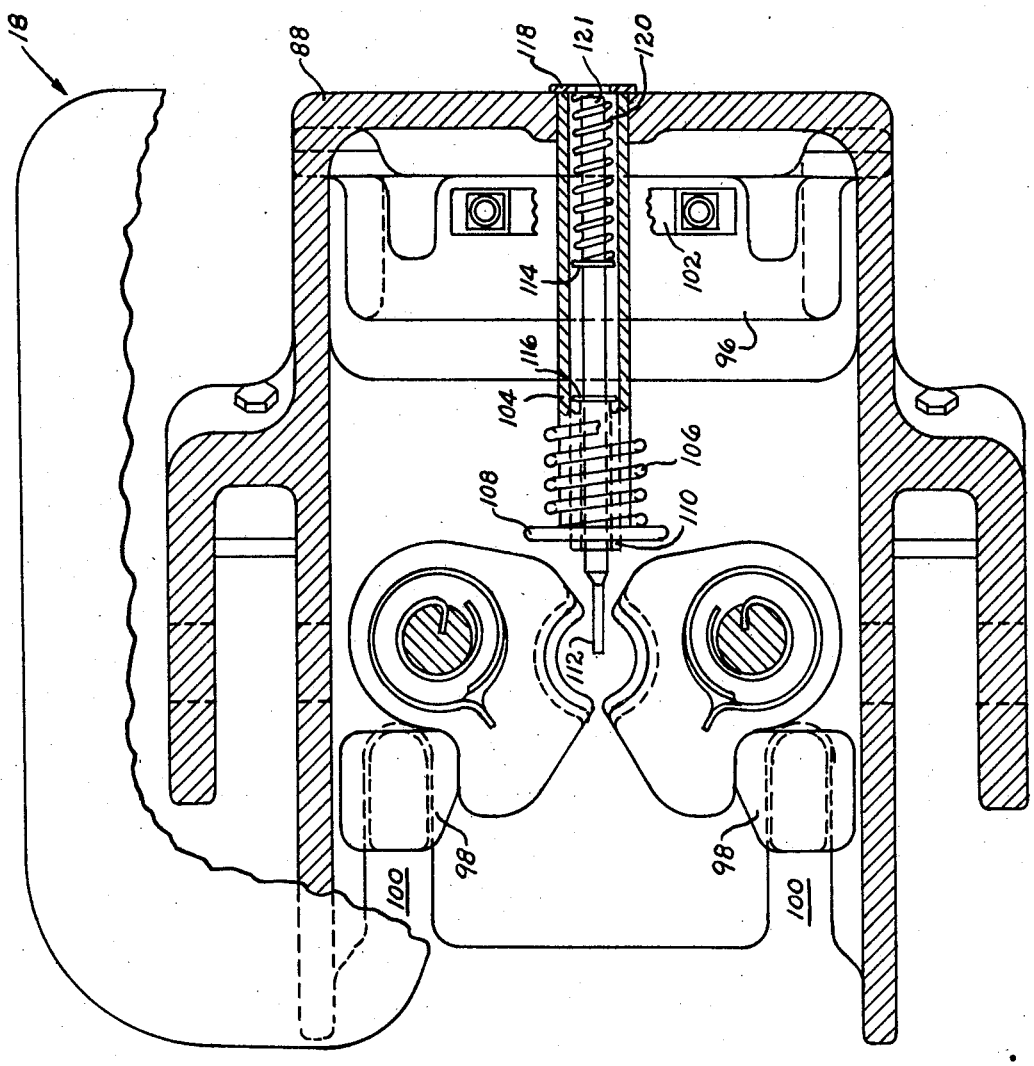
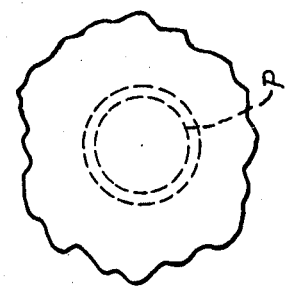
FIG. 6.

United States Patent Office 3,513,804
Patented May 26, 1970

3,513,804
KINGPIN LOCATION INDICATOR FOR A
COLLAPSIBLE TRAILER HITCH
Richard P. Yeates, Bridgeton, and Boris S. Terlecky,
St. Louis, Mo., assignors to ACF Industries, Incorporated, New York, N.Y., a corporation of New Jersey
Filed Oct. 8, 1968, Ser. No. 765,813
Int. Cl. G01d 21/00
U.S. Cl. 116—114                                6 Claims

ABSTRACT OF THE DISCLOSURE

A trailer supporting hitch on a railway car, adapted to be raised and knocked down by a tractor, has an indicator which shows whether the kingpin engaging jaws are open or closed. Another indicator is provided to show that the kingpin is, in fact, within the closed jaws.

BACKGROUND OF THE INVENTION

Great damage is likely if a trailer on a railway car is not properly secured to the trailer hitch. Indicators or signaling devices have, therefore, been provided to indicate that the fifth wheel jaws for engaging the trailer kingpin are locked closed. The fact that the jaws are closed does not, however, insure that the kingpin is within the jaws and properly seized thereby. It is, therefore, of the utmost importance to indicate constantly whether the kingpin is in its proper position within the jaws of the fifth wheel plate.

SUMMARY OF THE INVENTION

A trailer hitch is mounted on the deck of a railway car. The hitch includes a vertical leg and an inclined leg pivotally connected to the deck of the car, with the upper end of the inclined leg pivoted to the vertical leg. A fifth wheel device is mounted on the upper end of the vertical leg and provided with jaws for engaging the trailer kingpin. Latching means urged by a spring lock the jaws closed, and at the same time move a visible indicator to show that the latching means is in its locking position. When the kingpin enters and remains in the jaws, it actuates a spring pressed rod and moves the outer end thereof to a predetermined visible position, which indicates that the kingpin is properly lodged in the jaws. The arrangement is particularly applicable to tractor operated hitches.

BRIEF DESCRIPTION OF THE DRAWING

The accompanying drawing consists of the following figures:

FIG. 4 is an enlarged plan view of the fifth wheel structure, partly in section, with the kingpin locking jaws in open position.

FIG. 6 is an enlarged plan view of the fifth wheel structure, with parts broken away, showing the kingpin outside the closed jaws.

DESCRIPTION OF THE PREFERRED EMBODIMENT

Figure 1:
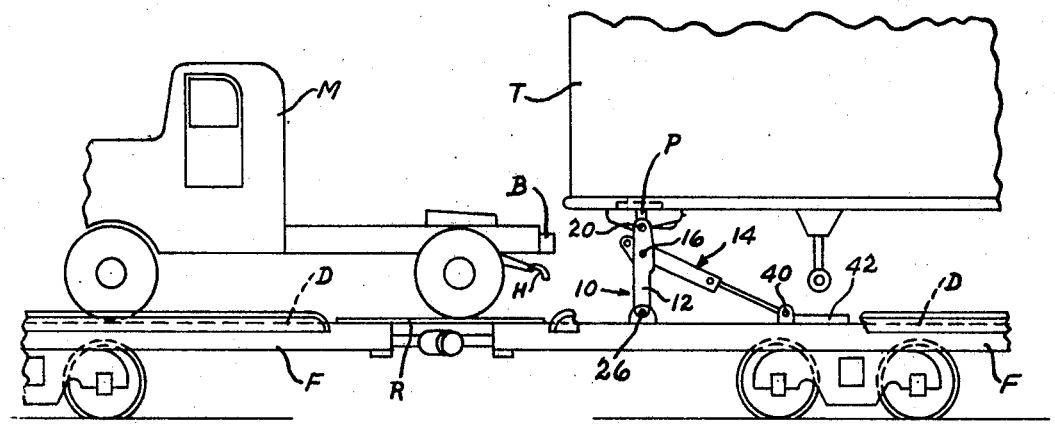
FIG. 1 is a partial elevational view of a highway trailer having its front end supported by a collapsible hitch on a railway car.

Referring to the drawings, and particularly to FIG. 1, railway flat cars F are coupled to each other and their floor or deck plates D are spanned by bridge plates R. A tractor M is supported on bradge plates R when moving from one flat car to another. A trailer T is partially shown in FIG. 1 and a collapsible trailer hitch or support indicated generally at 10 is mounted on flat car F. Trailer T has a kingpin P extending from its front end (see also FIGS. 5 and 6) which is engaged and locked in position to hold the associated trailer in secured position.

Figure 2:
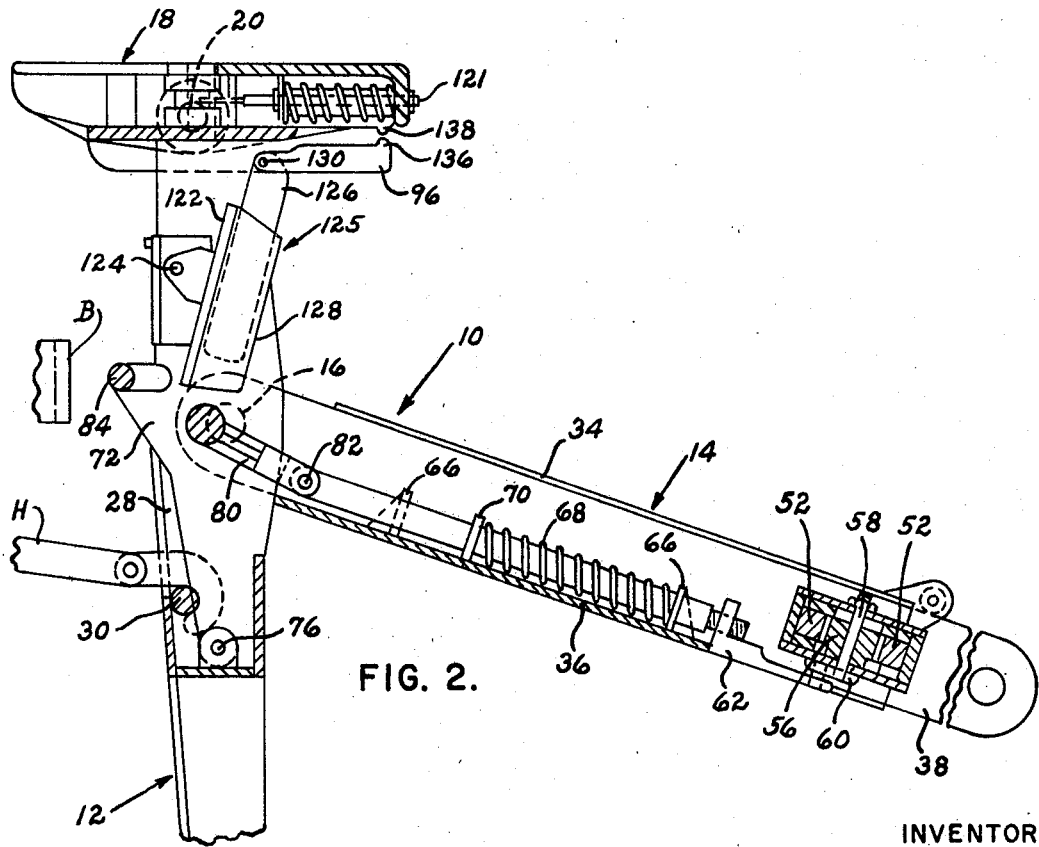
FIG. 2 is a partial side elevational view of the hitch with certain parts broken away, showing the hitch in erect position.

Referring to FIG. 2, hitch 10 comprises a vertical support member generally designated 12 and a diagonal support member generally designated 14 pivotally connected about horizontal pivot 16 to vertical support member 12. A supporting plate structure generally designated 18 to pivotally connected about horizontal pivot 20 to the extending end of vertical support member 12. Hitch 10 is adapted to be pulled from a collapsed position to an erect position by a hook H on the rear of tractor M upon forward movement of the tractor. A bumper block B on the rear of tractor M is adapted to knock hitch 10 to a collapsed position from erect position upon rearward movement of tractor M and effect unlocking of the trailer kingpin P and unlocking of diagonal support member 14 to permit collapsing of hitch 10, as will be explained more fully.

Vertical support member 12 is pivotally connected to lugs 26. The front face of vertical support 12 has an open pocket 28 in which a pull bar 30 is secured. To erect hitch 10, pull bar 30 is engaged by hook H mounted on the end of tractor M. The hitch is generally similar to that shown in Pat. 3,234,893 and is operated by the tractor in the same manner.

Diagonal support member 14 comprises a pair of upper diagonal legs 34 connected by a bottom plate 36. Telescoped within each leg 34 is a separate lower leg 38. Each leg 38 is pivotally mounted at 40 to a shoe 42 mounted for cushioned back and forth sliding movement along floor D. To hold legs 34 and 38 in proper aligned position when the hitch is erected, aligned openings are formed in legs 34 and 38. Locking pins 50 are inserted through the aligned openings in legs 34, 38 to lock diagonal support member 14 in erect position of the hitch.

Figure 3:
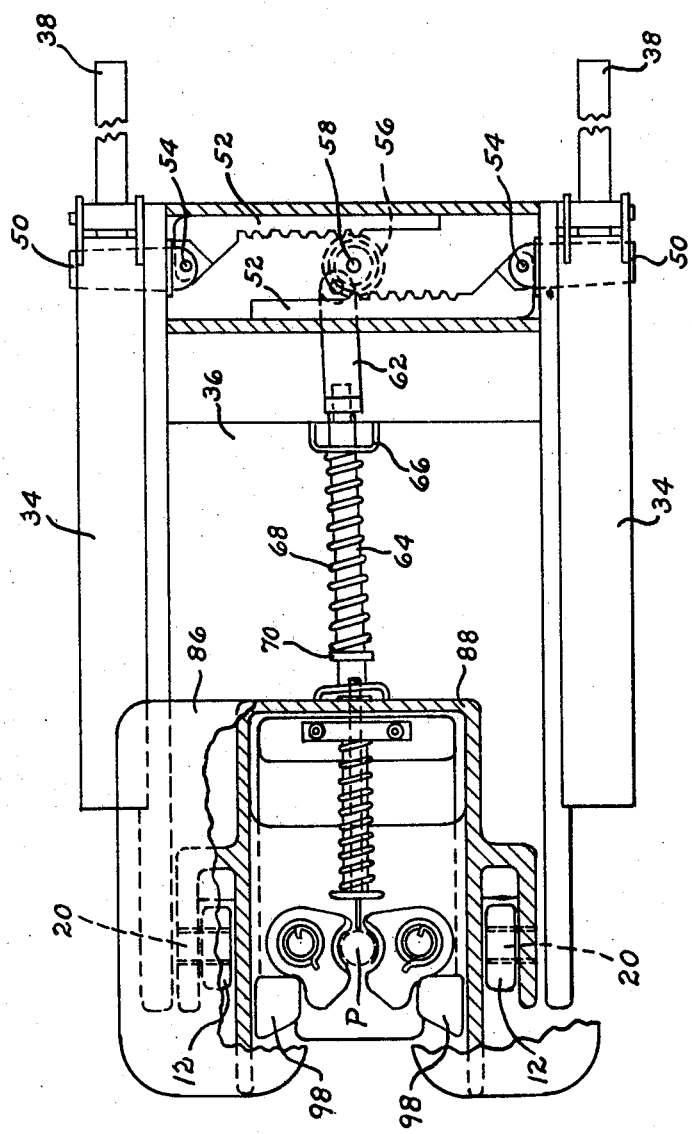
FIG. 3 is a partial plan view of the hitch, with certain parts broken away, showing the fifth wheel plate engaging the trailer kingpin.

Referring to FIGS. 2 and 3, locking means to move pins 50 in and out of locking position include racks 52 pivotally connected at 54 to pins 50. A pinion 56 on shaft 58 engages racks 52. A lever or arm 60 is fixed to the lower end of shaft 58 and a link 62 is pivotally connected to arm 60. Rod 64 is mounted for longitudinal movement through an opening of projections 66 secured to bottom plate 36. Spring 68 is compressed between a stop 70 secured to rod 64 and projection 66 to bias rod 64 and pinion 56 in a direction to urge pins 50 outwardly in locked position with legs 34 and 38.

For moving rod 64 and pinion 56 in an opposite direction for unlocking legs 34 and 38 to permit collapsing of hitch 10, a push lever or actuating member 72 is pivoted at 76 on vertical support member 12. Lever 72 has a link 80 pivoted at 82 to rod 64, and a horizontal push bar 84 is positioned forwardly of vertical support member 12. Lever 72 is urged outwardly by the bias of spring 68 and rod 64 to project push bar 84 forwardly of vertical support 12. To knock hitch 10 from erect position to collapsed position, bumper block B on the rear of tractor M engages push bar 84 upon rearward movement of the tractor to move rod 64 and rotate pinion 56 for pulling pins 50 from the openings within telescoping legs 34 and 38, and rearward movement of the tractor knocking hitch 10 to collapsed position.

Mounting plate structure 18 includes an upper plate 86 having an understructure 88 connected to vertical support member 12 by pivots 20. Jaws 90 and 92 are urged to their open position by torsion springs 94, and are closed when engaged by a kingpin. To hold jaws 90, 92 in closed position, as shown in FIG. 3, or in open position, as shown in FIG. 4, a yoke 96 is mounted beneath plate 86, the yoke having upwardly projecting lugs 98 on its forward end adapted to move in slots 100. The rear end of yoke 96 carries bracket 102 through which tube 104 extends to understructure 88, in which the tube is anchored. Spring 106 on tube 104 extends between stop 108 and bracket 102. Thus, spring 106 urges yoke 96 rearwardly to pull lugs 98 into their locking position, as shown in FIGS. 4 and 6. Within tube 104 is a fixed sleeve 110, and a rod or probe 112 having collars 114 and 116 fixed thereto. Ring 118 is welded to understructure 88. Between ring 118 and stop 114 is coil spring 120, for urging probe 112 forwardly until stop 116 strikes sleeve 110, as shown in FIG. 6. The rear end 121 of probe 112, which will project rearwardly beyond understructure 88 when pushed back by kingpin P, is preferably painted white to make it more conspicuous.

Jaws 90 and 92 are opened to release kingpin P when bumper block B on the rear of the tractor strikes bar 84, moving it and lever 72 rearwardly. Lever 72 then turns plate 122 counterclockwise about pivot 124. The upper part 126 of lever 125 is slidable in the lower part 128 and is pivotally connected to yoke 96 at 130. Yoke 96 thus moves forwardly, and lugs 98 unlock the jaws and permit torsion springs 94 to turn jaws 90, 92 to their open position. Further movement of lever 72 by bumper block B moves rod 64, actuating pinion 56 and racks 52, and withdrawing pins 50 to allow diagonal support 14 to telescope and the hitch to fall.

Figure 5:
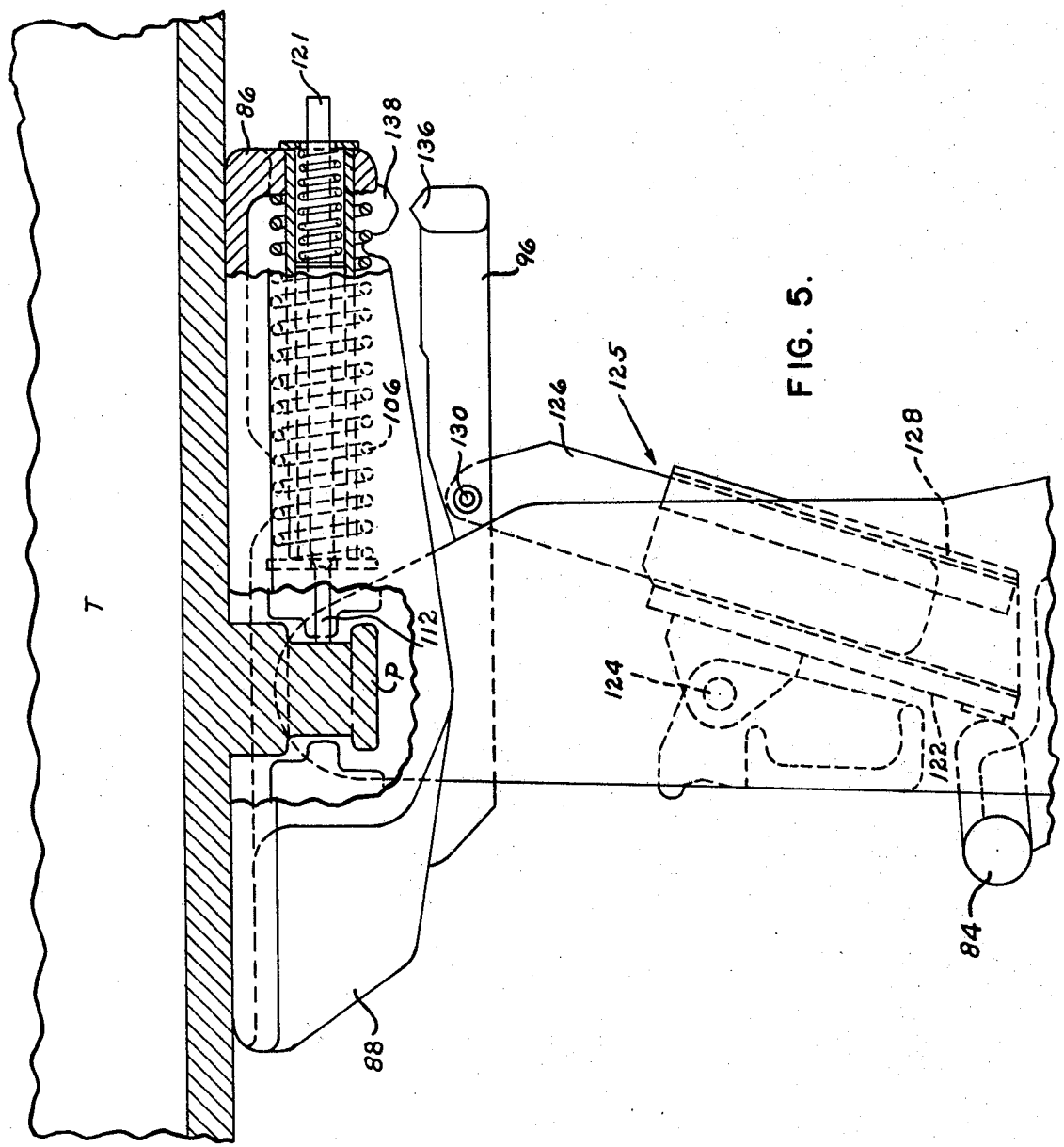
FIG. 5 is an enlarged side elevation of the upper portion of the hitch, with parts broken away.

When, as previously described, the hitch is pulled up from a collapsed position by connecting hook H of tractor M to pull bar 30 and driving the tractor forwardly, kingpin P engages open jaws 90, 92 and closes them against the force of torsion springs 94. At the same time, kingpin M moves probe or rod 112 against spring 120 until the end 121 of rod 112 projects out as shown in FIG. 5, to indicate that the kingpin is located between jaws 90, 92. When the jaws close, yoke 96 is moved rearwardly by spring 106 until lugs 98 are seated against the jaws to lock them in their closed position. Yoke 96 is provided with a pointed indicator 136, preferably painted a conspicuous color, which registers with a similar index member 138 fixed to the understructure 88, when yoke 96 is in its locking position. Thus, indicators 121 and 136 show that jaws 90, 92 are latched closed and that the kingpin is within the jaws.

We claim:

1. In a collapsible hitch adapted to be mounted on the deck of a railway car for securing a trailer for transit, a support mounted for movement between a collapsed position adjacent said deck and an erect position, a fifth wheel mounting plate connecting to the upper end of said support, and said mounting plate having kingpin engaging and retaining jaws movable by the kingpin to engage the kingpin, the improvement comprising a probe positioned so as to be engaged and moved by the kingpin when the latter enters the jaws, and means having an indicator portion connected to the probe for moving said indicator portion to a predetermined position when the probe is moved by the kingpin.

2. Apparatus according to claim 1, wherein the probe is a bar extending rearwardly from the jaws, a spring being connected to said bar to urge it forwardly into the space between said jaws.

3. Apparatus according to claim 2, wherein said indicator portion is the rear end of said probe and is normally retracted within the fifth wheel plate by said spring, and is moved a predetermined distance outside said plate when the probe is moved by the kingpin.

4. Apparatus according to claim 1, including locking means adjacent the jaws movable to lock the jaws in their kingpin engaging position, and means connected to said locking means for visibly indicating whether said jaws are locked closed by said locking means.

5. In a collapsible hitch adapted to be mounted on the deck of a railway car for securing a trailer for transit, a support mounted for movement between a collapsed position adjacent said deck and an erect position, a fifth wheel mounting plate connected to the upper end of said support, said mounting plate having kingpin engaging and retaining jaws movable by the kingpin to engage the kingpin, and locking means adjacent said jaws movable to lock the jaws in their kingpin engaging position, the improvement comprising visual indicating means responsive to the kingpin for indicating whether the kingpin is located between said jaws.

6. Apparatus according to claim 5, wherein said indicating means includes an indicator responsive to said locking means for indicating whether said jaws are locked in their closed positions.

References Cited

UNITED STATES PATENTS

| | | | |
|---|---|---|---|
| 3,050,320 | 8/1962 | Clejan | 287—20 |
| 3,190,595 | 6/1965 | Ferris | 248—119 |
| 3,268,250 | 8/1966 | Ferris | 105—368 |
| 3,358,955 | 12/1967 | Wille et al. | 248—119 |
| 3,424,107 | 1/1969 | Rollins | 105—368 |
| 3,444,825 | 5/1969 | Rollins | 105—368 |

LOUIS J. CAPOZI, Primary Examiner

U.S. Cl. X.R.

105—368; 248—119; 287—20